Dec. 26, 1967  J. A. RUSH  3,360,796
RADAR SYSTEM FOR THE DETECTION OF MOVING OBJECTS
Filed Dec. 2, 1965  2 Sheets-Sheet 1

INVENTOR
JOSEPH A. RUSH

BY *C.J. Crickenberger*
ATTORNEY 3,360,796
RADAR SYSTEM FOR THE DETECTION OF
MOVING OBJECTS
Joseph A. Rush, Fairfax, Va., assignor to Keltec
Industries, Inc., Alexandria, Va.
Filed Dec. 2, 1965, Ser. No. 511,163
4 Claims. (Cl. 343—7.7)

ABSTRACT OF THE DISCLOSURE

A frequency-modulated radar system for identifying moving objects is provided by utilizing a magnetic drum cancellation circuit in which successive reflected signal cycles are stored and compared in opposite phase relationship to eliminate identical out-of-phase signal components produced by stationary objects. The residual signal contains moving object information and may be displayed audibly and visibly for identification by comparison with a library of identification patterns.

---

Figure 1:
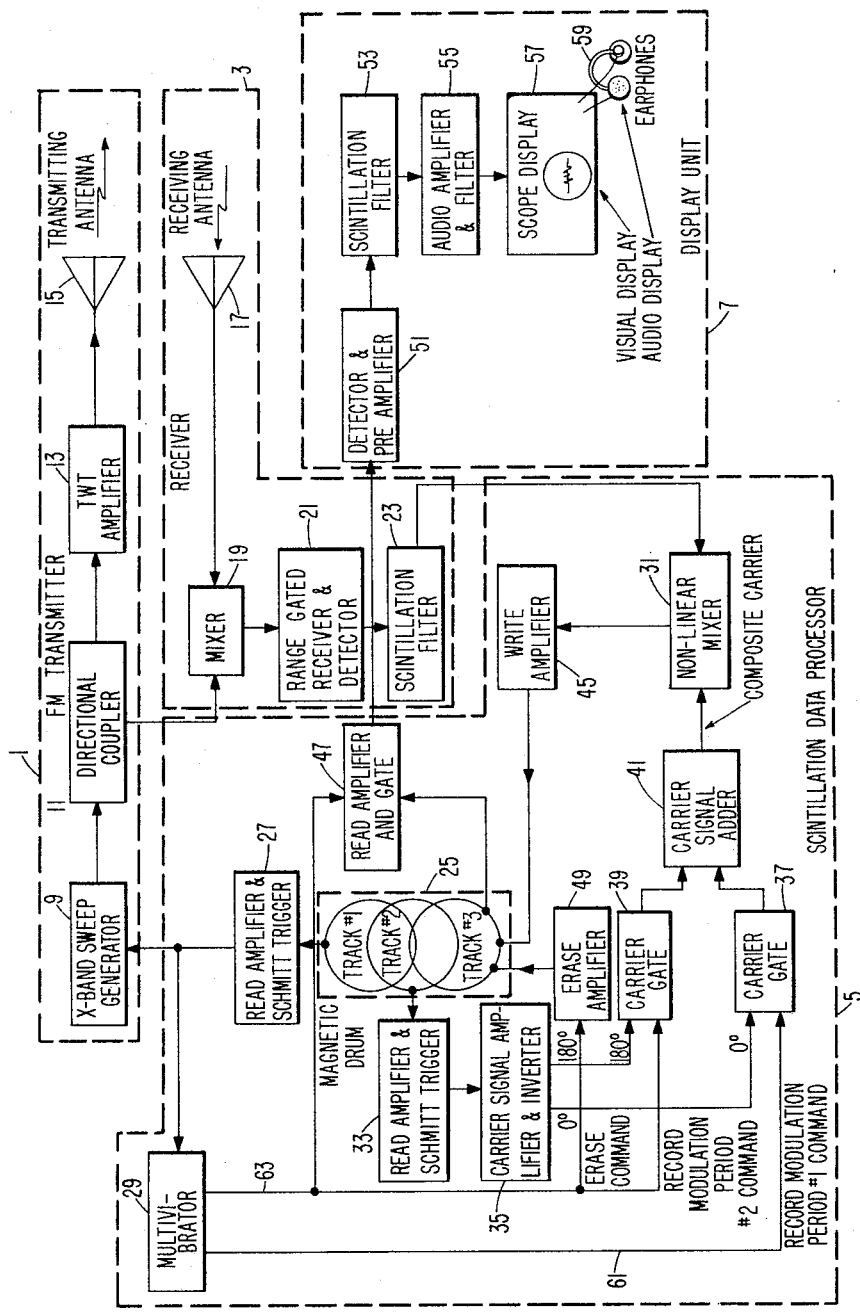

This disclosure relates to a radar system for the detection of moving objects, and more particularly to a frequency-modulated, high-duty cycle radar system for detecting and identifying moving objects against a substantially stationary background.

The operation of radar detection systems for determining the distance and relative location of a target may be classified broadly in three categories: The continuous-wave system, the frequency-modulated system and the pulse-modulated system. In the continuous-wave system a continuous-wave carrier of single frequency is transmitted, and the reflected energy from a target object is changed in frequency when the target object is moving toward or away from the radar transmitter. This change in frequency is known as the Doppler effect. This system works well when the target object is moving relatively fast, but when the target object is slow or stationary the results are not generally satisfactory.

A frequency-modulated radar system employs transmitted energy which is varied continuously and periodically over a specified band of frequencies. The instantaneous frequency of the reflected energy differs from the instantaneous frequency of the energy being transmitted, and since this frequency difference depends on the distance travelled, it can be used as a measure of target range. Moving targets produce a frequency shift in the reflected signal because of the Doppler effect, however, and this affects the accuracy of range measurements for moving targets. Therefore, the frequency-modulation method works better with stationary or slowly moving targets.

The most commonly used radar systems employ pulse-modulation in which pulses of microsecond duration are transmitted. The interval of time elapsing between the transmission and reception of the reflected pulse is a direct measure of the target range. Since the pulse-modulation method does not depend on relative frequencies of the emitted and returned signals, or on the motion of the target, the deficiencies of the continuous-wave and frequency-modulation methods of transmission are not present.

When it is desired to distinguish moving targets from stationary terrain clutter, and to identify these targets, all of the basic systems discussed above are deficient in one or more respects, largely because none provides an effective means of separating the target and clutter signals for ready identification of the target. The present invention is directed to a combination of the continuous-wave and frequency-modulated systems of radar operating in a high-duty cycle over a broad band of frequencies to enable the ready identification of moving target surrounded by substantially stationary terrain clutter, such as might be encountered by a man moving in a thickly-wooded area. The basic principle of operation depends upon the fact that different target objects have different electromagnetic wave energy reflective properties. Because of these properties target objects can be associated with distinct frequency spectrum patterns of reflection. For example, the reflected frequency spectrum pattern of a man walking is separate and distinct from the pattern of a moving vehicle such as an automobile or truck, and these patterns appear on the lower end of the frequency spectrum. Objects such as the leaves on trees generate frequency spectrum patterns at considerably higher frequencies than those of other target objects.

Since distinct patterns in the frequency spectrum of operation may be associated with specified target objects, a library of identification patterns can be established whereby any given pattern in the frequency spectrum commonly encountered can be identified readily as to the particular target object involved. This fact of operation is extremely useful when it is considered that the present system eliminates stationary terrain clutter and other clutter, such as foliage, which is removed from the frequency of interest.

Accordingly, it is an object of this invention to provide a radar system for identifying moving objects from among stationary and natural terrain clutter objects.

Another object of the invention is to provide a broad-band, frequency-modulated, high-duty cycle radar system in which a moving target object is identifiable by means of its reflected energy spectrum.

A further object is the provision of a radar system in which a novel means is employed for the cancellation of signals representing stationary terrain clutter objects.

A still further object of the invention is the provision of a broad-band frequency-modulated, high-duty cycle radar system in which a magnetic drum is employed as a storage and comparison device for eliminating unwanted components of the reflected energy received.

These objects are realized in a system for the detection of moving objects in which a transmitter for transmitting a broad-band, frequency-modulated, high-duty cycle signal is utilized in conjunction with a receiver for receiving the reflected portions of the signal. Synchronizing means are provided for energizing the transmitter periodically to produce discrete transmitter sweep signal cycles. A magnetic drum rotating at thirty cycles per second provides the means for system synchronization and special gating wave form generation. Three tracks are utilized on the drum surface. The first track provides the synchronizing signal to generate the transmitter sweep signal cycles, and to energize a multivibrator which generates a fifteen cycle per second square wave in synchronism with the sweep signal cycle of the transmitter. Track #2 of the magnetic drum device has a symmetrical square wave carrier signal recorded thereon to provide the carrier used in the data processing circuitry. The signal on track #2 is synchronized with the synchronizing pulse on track #1. Track #3 is used as a storage and cancellation medium for the reflected energy signal.

Successive reflected sweep signal cycles are recorded on track #3 of the magnetic drum in exact superimposed relationship such that identical signals characterizing stationary terrain clutter are substantially cancelled. The residue signal then represents the moving target components of the reflected wave energy signal. This residual signal can be displayed visually or audibly, as desired to make the required target objection identification.

Figure 2:
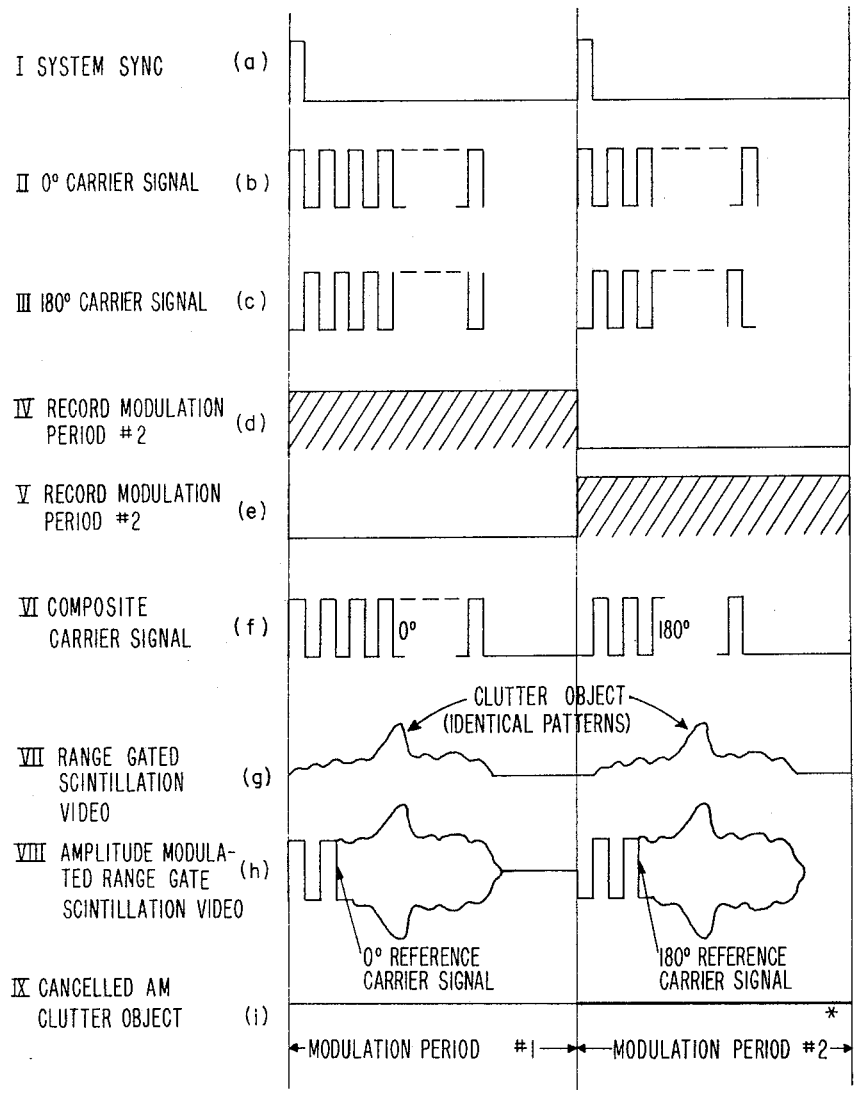

The foregoing and other objects, features and advantages of the invention will be apparent from the following more particular description of a preferred embodiment of the invention, as illustrated in the accompanying drawings in which:

FIG. 1 is a block diagram of a radar system embodying the principles of the present invention; and FIG. 2 is a timing chart showing the system waveforms at various points.

Before proceeding with a description of the figures of the drawing, it will aid in understanding the invention to consider the properties of the target objects and the terrain clutter objects to be encountered in the use of the present system. It has been found experimentally that various target objects reflect electromagnetic wave energy differently at different frequencies, and further that the reflection (or scintillation) patterns vary with movements of the target objects. When a target object is subjected to electromagnetic wave energy covering a wide band of frequencies, the scintillation energy can be used to modulate a low frequency carrier to yield a frequency spectrum in which signal components representing specific target and clutter objects are localized in position and assume distinct amplitude patterns. Thus, the motion of an object which is being irradiated with a broad-band of frequencies of electromagnetic wave energy produces a scintillation pattern or echo which might be termed "electromagnetic noise." By properly identifying and cataloging the "electromagnetic noise" associated with commonly encountered objects, it is possible to identify these objects as moving targets among terrain clutter, when the terrain clutter is removed by cancellation and separation procedures made possible by this invention.

FIG. 1 of the drawing is a block diagram of a system embodiment of the present invention. The system is shown generally as comprising a frequency-modulated, high-duty cycle, transmitter 1, a receiver 3, a scintillation data processor 5 and a display unit 7. The transmitter 1 comprises an X-band sweep generator 9 capable of producing a linear sweep variation from 8.2 to 9.5 kilomegacycles. The energy from the sweep generator 9 passes through directional coupler 11 and is amplified by travelling-wave tube amplifier 13 to a level of approximately 250 milliwatts before being fed to transmitting antenna 15. The sweep rate for generator 9 was chosen at 100,000 megacycles per second squared.

The scintillation energy from the target and terrain objects (not shown) is received by receiving antenna 17 and fed to mixer 19, where it is heterodyned with a portion of the sweep generator signal derived from directional coupler 11. The heterodyned signal is fed to the range-gated receiver and detector 21, and from there to scintillation filter 23 which rejects signal returns outside the range of interest.

The scintillation data processor 5 has its central element magnetic drum 25, three tracks of which are utilized in the present system. Track #1 has a single 10μ sec. synchronizing pulse recorded thereon to be read by read amplifier and Schmitt trigger 27 and subsequently applied to the X-band sweep generator 9 to initiate a sweep cycle. The initiating pulse from track #1 of magnetic drum 25 is also used to turn on multivibrator 29 whose function will be explained subsequently.

Track #2 of magnetic drum 25 has recorded a 20-kilocycle square wave which provides the synchronized carrier signal employed in the data processor. The start of the carrier signal is coincident in time with the synchronizing pulse on track #1, and the signal on track #2 terminates at the end of the transmitter sweep cycle. In the present embodiment the magnetic drum rotates at a speed of 30 cycles per second, and multivibrator 29 generates a 15-cycle per second square wave in synchronism with the magnetic drum rotation. The transmitter sweep cycle is approximately 15 milliseconds, which is the duration of the carrier signal on track #2 of magnetic drum 25.

The output of mixer 19 is a spectrum of frequencies which includes the range component to the target, together with the amplitude and phase components attributable to terrain and target scintillation. The receiver 3 provides a variable tuning capability over the selected target range and scintillation frequencies, and rejects signal returns outside the frequencies of interest. Typical operation of the present system has utilized a receiver tuned to 45 kilocycles and 60 kilocycles for highway targets and targets located somewhat further away in the woods, respectively. In this operation a receiver bandpass of 600 cycles was found to be sufficient to pass the frequency component of range and the scintillation side band energy.

The scintillation side band energy from scintillation filter 23 is fed to a non-linear mixer 31 where it is used to modulate a composite carrier signal. The carrier signal is obtained from track #2 of magnetic drum 25 by means of read amplifier and Schmitt trigger 33. The carrier signal from read amplifier and Schmitt trigger 33 is amplified, and one portion of the signal is inverted in phase in carrier signal amplifier and inverter 35. The amplified in-phase signal is fed to carrier gate 37, while the inverted amplified signal is fed to carrier gate 39. Multivibrator 29 provides the timing signal to gate either the in-phase component or the inverted phase component through carrier signal adder 41 to non-linear mixer 31 where the composite carrier signal is modulated by the scintillation signal from receiver 3.

The modulated carrier signal is fed to write amplifier 45, and is written on the surface of track #3 of the magnetic drum 25. The synchronization of the system is such that when one complete sweep cycle is recorded on track #3, the next subsequent sweep cycle will be exactly superimposed in position, and displaced by 180° in phase at the carrier frequency. The magnetization produced on track #3 by the first sweep cycle recorded will have all signal components which are identically re-recorded during the second sweep cycle erased because of the inversion in phase of the superimposed recording signal. This action eliminates all clutter object signals which produce identical scintillation signals, during each sweep cycle. Moving target objects, which produce different scintillation signals during each sweep cycle, will not have their signal components erased, and this residual signal represents the moving targets present in the scintillation energy.

The residual signal on track #3 is read by read amplifier and gate 47. Gate 47 is energized by multivibrator 29 simultaneously with erase amplifier 49, which clears track #3 and prepares for the next set of superimposed recordings. The residual signal from read amplifier and gate 47 is passed to the display unit, where detector and preamplifier 51 reduces the signal to the desired frequency for handling in the display unit. Scintillation filter 53 and audio amplifier and filter 55 complete the processing of the residual signal. The residual signal may then be displayed visually by cathode ray tube 57, or audibly by ear phones 59.

The timing chart wave forms of FIG. 2 will serve to clarify the operation of the system shown in block form in FIG. 1. Wave forms for two complete sweep cycles are shown in FIG. 2. Graph $a$ shows the system sync pulse, which is the 10μ sec. synchronizing pulse recorded on track #1 of magnetic drum 25. Graph $b$ shows the in-phase carrier signal available at carrier gate 37. Graph $c$ shows the inverted carrier signal available at carrier gate 39. It would be well to note here that the carrier signals of graphs $b$ and $c$ are equal in amplitude and 180° out of phase so that they exactly cancel each other. Consequently, the modulation of these two carrier signals with identical signal information would also yield modulated signals which would exactly cancel each other.

Graphs *d* and *e* show the square wave output of multivibrator 29 as available on lines 61 and 63, respectively. Graph *f* shows the composite carrier signal available at carrier signal adder 41 by virtue of gating, in series fashion, one sweep cycle of the in-phase carrier signal and a second sweep cycle of the inverted phase carrier signal.

Graph *g* shows the scintillation signal for a clutter object target which is identical for both sweep cycles, but is displaced 180° at the frequency of the carrier signal during the second sweep signal. Graph *h* shows the composite carrier signal of graph *f* after modulation by the scintillation signal of graph *g*. Graph *i*, which is nothing more than a straight line, shows the net result of superimposing the two modulated signals of graph *h* so that all components cancel. This operational graph indicates there was no moving target object.

The system of this invention presents a new and novel radar technique which offers unlimited possibilities in any application where it is desired to separate a moving target from background clutter objects and identify that target. While the invention has been shown and described with particular reference to a preferred embodiment, it will be understood by those skilled in the art that various changes in form and details may be made without departing from the spirit and scope of the invention.

What is claimed is:

1. A cancellation circuit for cancelling identical signal components from first and second information signals comprising
    a magnetic drum,
    means to record said first information signal on said drum,
    means to invert in phase said second information signal,
    means to record said inverted second information signal in exact superimposed relationship to said first information signal on said drum,
    whereby said identical signal components, being exactly superimposed but inverted in phase, will be cancelled and leave a residual signal comprising the non-identical signal components of said first and second information signals, and
    means to read said residual signal from said drum.

2. A cancellation circuit for cancelling identical signal components from first and second information signals comprising
    a magnetic drum,
    a first source of carrier signals,
    a second source of carrier signals 180° out-of-phase with said first source of carrier signals,
    means alternately energizing said first and second sources of carrier signals to produce a composite carrier signal,
    means to modulate said composite carrier signal with said first and second information signals during first and second modulation periods corresponding to the action of said means for alternately energizing,
    means to write said modulated composite carrier signal on said magnetic drum,
    said magnetic drum being rotated in synchronism with said means for alternately energizing such that said first and second modulation periods of said modulated composite carrier signal are exactly superimposed on said magnetic drum thereby cancelling identical out-of-phase signal components present in said first and second information signals and leaving a residual signal, and
    means to read out said residual signal from said magnetic drum.

3. A radar system for the detection of moving objects comprising
    transmitter means for transmitting a broad-band frequency-modulated, high-duty cycle signal,
    receiver means for receiving reflected portions of said signal,
    said reflected portions containing the target components indicative of the characteristics of a given moving target object and clutter components indicative of the characteristics of the moving and stationary terrain clutter,
    means for comparing successive reflected portions of said signal and removing unwanted signal components including
        a magnetic drum device,
        means to write successive reflected portions of said signal in superimposed relationship and 180° out-of-phase with each other on a single track of said magnetic drum thereby cancelling identical out-of-phase signal components and leaving recorded thereon a residual signal, and
        means to read the residual signal from said single track of said magnetic drum,
        said clutter components being substantially removed, and said target components characterizing moving targets being retained in said residual signal, and
    means utilizing said residual signal for indicating said retained target components of said reflected signal,
    whereby said target components serve to identify the target object.

4. A radar system for the detection of moving objects comprising
    transmitter means for transmitting a broad-band, frequency-modulated, high-duty cycle signal,
    means for energizing said transmitter means periodically to produce discrete transmitter sweep signal cycles,
    receiver means for receiving reflected portions of said signal,
    said reflected portions containing target components indicative of the characteristics of a given moving target object and clutter components indicative of the characteristics of moving and stationary terrain clutter,
    means for comparing successive reflected sweep signal cycles and removing unwanted signal components including a magnetic drum device,
        a first source of carrier signals,
        a second source of carrier signals 180° out-of-phase with said first source of carrier signals,
        means alternately energizing said first and second sources of carrier signals in synchronism with the energizing of said transmitter means to produce a composite carrier signal,
        means to modulate said composite carrier signal with the reflected portions of said sweep signal cycles,
        means to write said modulated composite carrier signal on said magnetic drum,
        said magnetic drum being rotated in synchronism with the energizing of said transmitter means such that successive sweep cycles of said modulated composite carrier signal are superimposed on a single track of said magnetic drum thereby cancelling identical out-of-phase signal components and leaving a residual signal representative of the target components characterizing moving targets, and
        means to read the residual signal from said single track of said magnetic drum, and
    means utilizing said residual signal for indicating said retained target components of said reflected sweep signal cycles, whereby said target components serve to identify the target object.

References Cited

UNITED STATES PATENTS

| | | | |
|---|---|---|---|
| 2,566,189 | 8/1951 | Gloess | 343—7.7 |
| 2,951,160 | 8/1960 | McCartney | 343—7.7 X |
| 3,299,426 | 1/1967 | Learned et al. | 343—7.7 |

OTHER REFERENCES

Skolnik: Introduction to Radar Systems, McGraw-Hill (1962), pp. 86–90.

RODNEY D. BENNETT, *Primary Examiner.*

C. L. WHITHAM, *Assistant Examiner.*